July 20, 1943.  R. W. ALLEN  2,324,986
TIRE SHAPING APPARATUS
Filed Aug. 3, 1940   7 Sheets-Sheet 1

July 20, 1943.  R. W. ALLEN  2,324,986
TIRE SHAPING APPARATUS
Filed Aug. 3, 1940  7 Sheets-Sheet 3

INVENTOR
Raymond W. Allen

BY

ATTORNEYS

July 20, 1943.  R. W. ALLEN  2,324,986

TIRE SHAPING APPARATUS

Filed Aug. 3, 1940   7 Sheets-Sheet 6

INVENTOR
Raymond W. Allen
BY
Ely & Frye
ATTORNEYS

INVENTOR
Raymond W. Allen
BY
ATTORNEYS

Patented July 20, 1943

2,324,986

UNITED STATES PATENT OFFICE 2,324,986

TIRE SHAPING APPARATUS

Raymond W. Allen, Akron, Ohio, assignor to The Firestone Tire & Rubber Company, Akron, Ohio, a corporation of Ohio Application August 3, 1940, Serial No. 350,794

5 Claims. (Cl. 18—2)

This invention relates to tire shaping apparatus such as is used for distending unvulcanized flat, drum-built pneumatic tire structures to tire shape and concurrently mounting an expansible core therein, and more especially it relates to improved tire shaping apparatus of the mentioned that employs super-atmospheric pressure for distending the tire structure.

The invention is an improvement upon the apparatus constituting the subject matter of my prior U. S. Patent No. 2,006,307, issued June 25, 1935, and is directed primarily to improved control means for automatically effecting a complete cycle of operations of the apparatus after the operative cycle has been manually initiated.

The chief objects of the invention are to provide improved tire shaping apparatus having greater flexibility than similar apparatus heretofore provided, that is, being more readily adaptable to variable conditions of manufacture; to increase the output of apparatus of the character mentioned; and to conserve time and reduce the manual labor required for operating the same. Other objects will be manifest as the description proceeds.

Referring now to Figs. 1 to 9 of the drawings, there is shown a tire shaping apparatus comprising a base structure 15 that carries a pair of upright posts 16, 16, which posts support a housing 17 at the upper ends thereof, in spaced relation to the base structure 15. The base 15 is formed with a central circular recess 18 in the top thereof, which recess is encompassed by an annular deflector plate 19, and an annular deflector ring 20 at the inner margin of said plate, said ring and plate being concentric with the axis of said recess. Said deflector ring and plate constitute the stationary lower head of a press structure for shaping an annular tire band, the deflector plate being adapted to support the tire band by engagement with the lower margin thereof. A supply pipe 21 for pressure fluid, specifically compressed air, is connected to a suitable source of pressure fluid (not shown) and discharges into the recess 18 of the base 15, during the operation of the apparatus, for distending a tire band as is well understood in the art.

Figure 1:
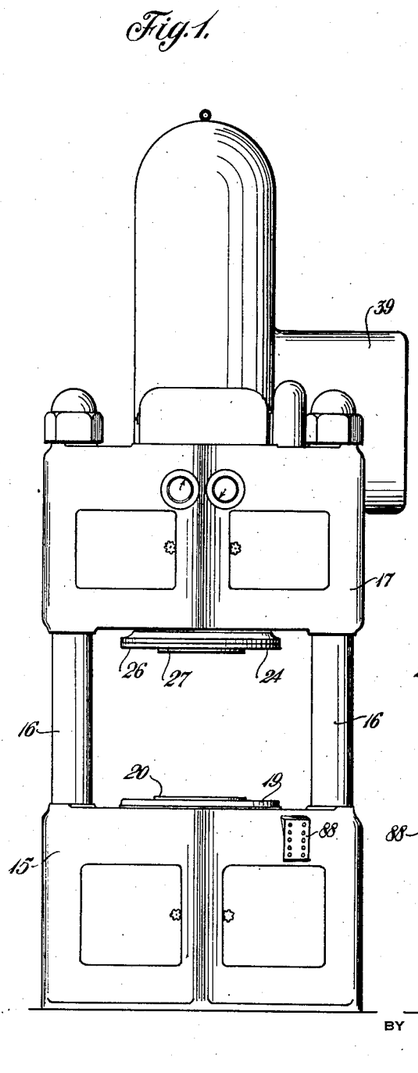
Fig. 1 is a front elevation of apparatus embodying the invention.
Figure 2:
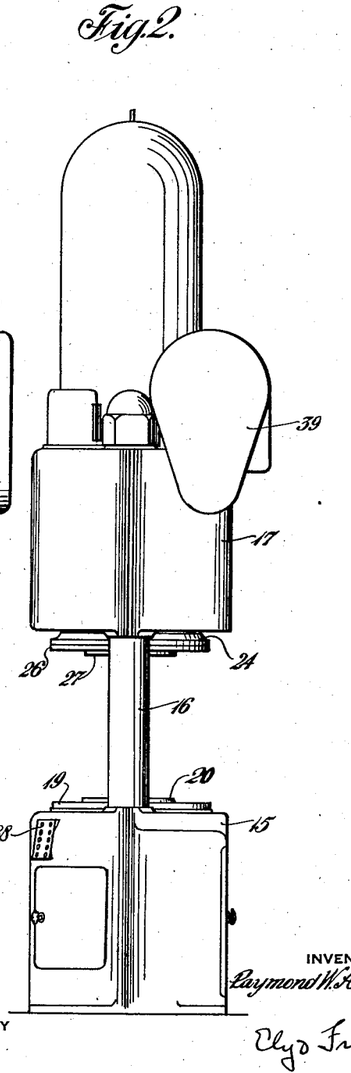
Fig. 2 is a side elevation thereof.
Figures 3, 4:
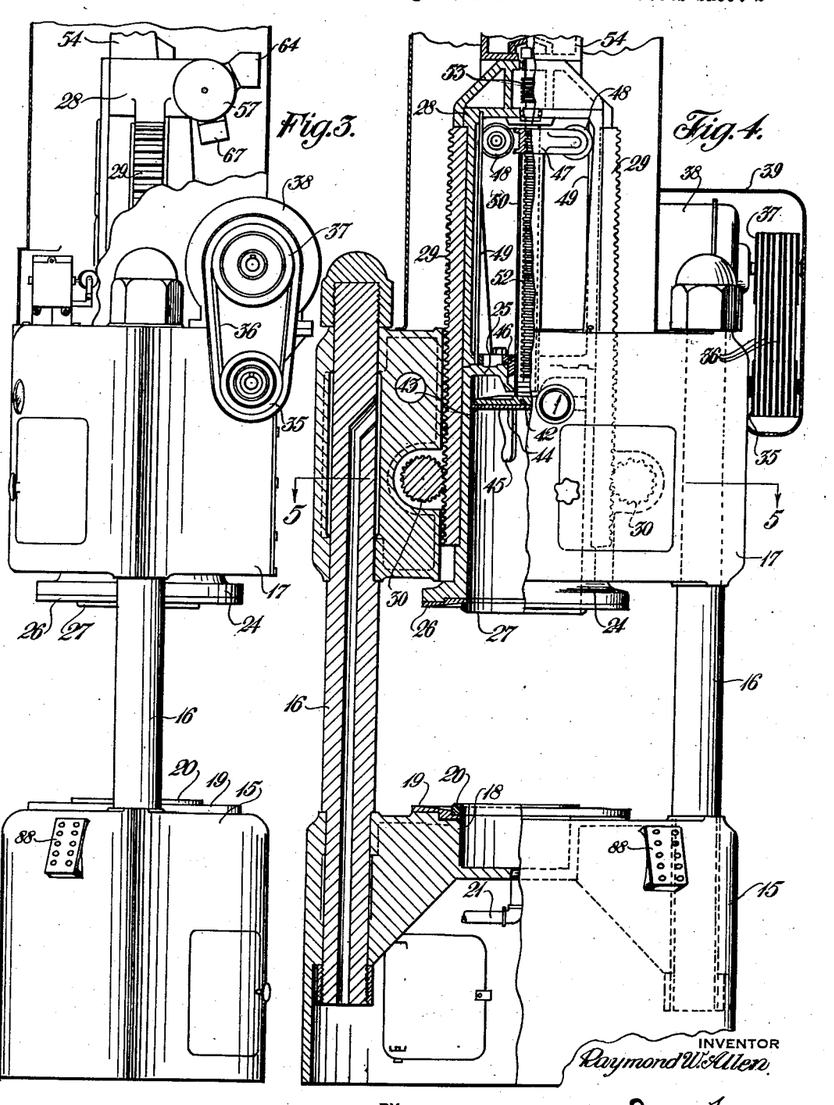
Fig. 3 is a view similar to Fig. 2, on a larger scale, parts being broken away to reveal underlying structure.
Fig. 4 is a view similar to Fig. 1, on a larger scale, parts being broken away and in section.
Figure 5:
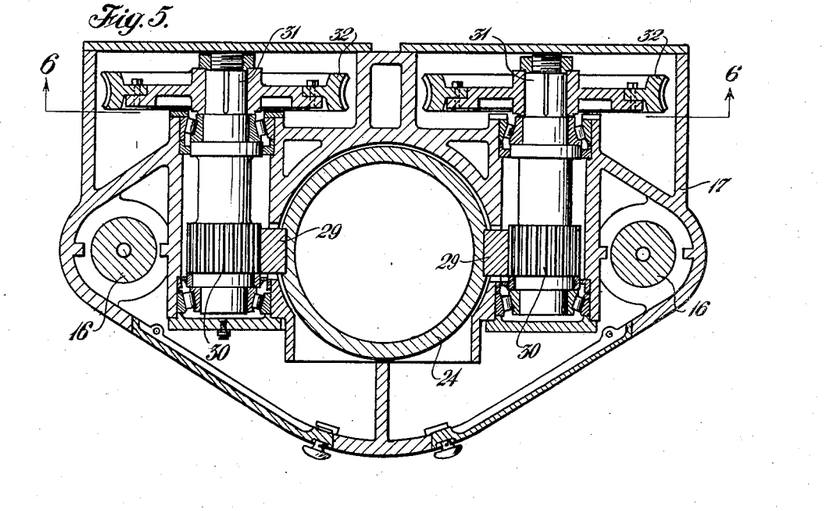
Fig. 5 is a section, on a larger scale, on the line 5—5 of Figure 4.
Figure 6:
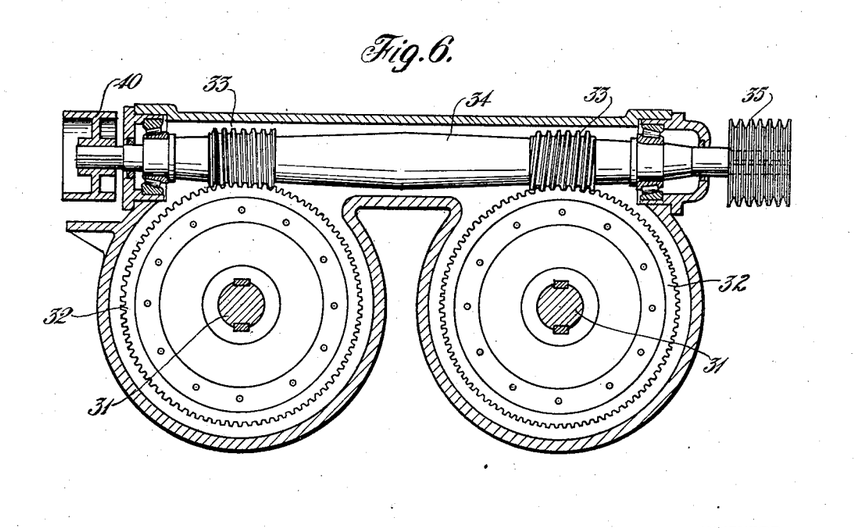
Fig. 6 is a section on the line 6—6 of Fig. 5.

Slidably mounted for vertical movement in the housing 17 is a hollow cylinder 24 having an open bottom and having its upper end closed by a wall 25, said cylinder being in axial alignment with the deflector plate 19 and recess 18 of the base member 15. The lower end of the cylinder 24 extends beyond the bottom of the housing, and has its end face provided with a deflector plate 26 and deflector ring 27 disposed concentrically of its vertical axis, said deflector ring and plate constituting a movable upper head adapted to engage the upper margin of a tire band under treatment in the apparatus. The cylinder 24 carries a skeleton pedestal 28 upon the top thereof, and for effecting vertical movement of the cylinder and pedestal, racks 29, 29 are secured thereto at diametrically opposite sides thereof. Meshed with said racks are respective gears 30, 30 that are formed on respective shafts 31, 31, the latter being journaled in the housing structure on parallel horizontal axes, as is best shown in Fig. 5. Mounted on each shaft 31, at the rear end thereof, is a worm gear 32, and meshed with the latter are respective worms 33 that are mounted upon a common shaft 34 that is journaled in the housing 17 above said gears 32. The ends of shaft 34 extend exteriorly of the housing, and mounted upon one projecting end of the shaft is a multigrooved pulley 35 about which is trained a plurality of transmission belts 36, 36, said belts also being trained about a multigrooved driving pulley 37 that is mounted upon the shaft of a reversible electric motor 38. The motor 38 is mounted upon the top of housing 17 and is enclosed in a suitable casing 39. The other end of shaft 34 may be provided with a brake drum 40 for cooperation with suitable braking mechanism (not shown) if desired. The arrangement is such that the motor 38 will raise and lower the cylinder 24 and pedestal 28 relatively of the housing 17.

Slidably mounted for vertical reciprocatory movement in the cylinder 24 is a piston or plunger 42 having the usual peripheral shoe or gasket 43. The bottom face of the piston 42 is formed with a transverse slideway in which is mounted an adjustable slide 44, the latter carrying a downwardly extending hook 45 that engages with an expansible core 86, Figs. 13 to 17, during operation of the apparatus, for drawing said core up into the cylinder 24. The piston 42 is carried on the lower end of a tubular stem 50, which stem extends through a suitable stuffing box 46 in the end wall 25 of the cylinder 24, the upper end of the tubular stem being connected to a guide nut 47. The latter is provided with oppositely extending arms in which are journaled respective grooved guide rollers 48, said rollers engaging respective vertical guide rods 49 carried by the pedestal 28.

Figure 11:
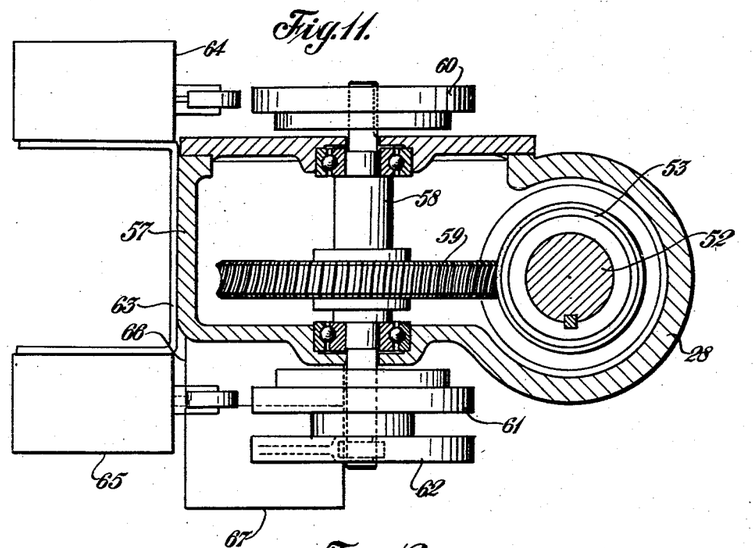
Fig. 11 is a section, on a larger scale, on the line 11—11 of Fig. 10.

For impelling the nut 47 and with it the piston 42, a vertical feed screw 52 is provided, said feed screw being threaded axially through the nut 47 and extending downwardly in the tubular stem 50. Said screw 52 is journaled at two axially spaced apart points in the upper part of the pedestal 28, and between said points has a worm 53 mounted thereon. Mounted upon the upper end of pedestal 28 is a bracket 54 upon which is mounted a reversible electric motor 55, said motor being arranged on a vertical axis and having driving connection with the feed screw 52 by means of a coupling 56. Thus it will be seen that the hook 45 will move up and down with the cylinder 24 as the latter is so moved, and also is movable up and down relatively of said cylinder by reason of its individual drive consisting of the motor 55. Formed on the upper end portion of the pedestal 28 is a small housing 57 in which is journaled a short shaft 58 upon which is mounted a worm gear 59 that is meshed with the worm 53 of the screw 52. As is best shown in Fig. 11, one end of shaft 58 has a cam 60 adjustably mounted thereon, and the opposite end of said shaft has cams 61 and 62 adjustably mounted thereon. Secured to housing 57 at the rear thereof is a bracket 63 that supports a pair of electrical switches 64 and 65, the switch 64 being so positioned that its operating lever is in the orbit of cam 60 and switch 65 being so positioned that its operating lever is in the orbit of cam 61. Secured to the bottom of housing 57 is a second bracket 66 that carries an electrical switch 67, the operating lever of the latter being in the orbit of cam 62. The arrangement is such that by adjusting the relative positions of the cams 60, 61, and 62 the switches 64, 65, and 67 may be operated in any desired sequence and with any desired dwell between the operation of successive switches. The switch 67 is a limit switch in the circuit of motor 55 and serves to stop the drive of said motor at the lower limit of movement of the hook 45. Switch 65 also is in the circuit of motor 55 and serves to stop the drive of the latter at the upper limit of movement of the hook 45. Switch 64 controls a solenoid valve (not shown) that starts the inflation of the expansible core that is inserted in a shaped tire band.

Figures 7, 8:
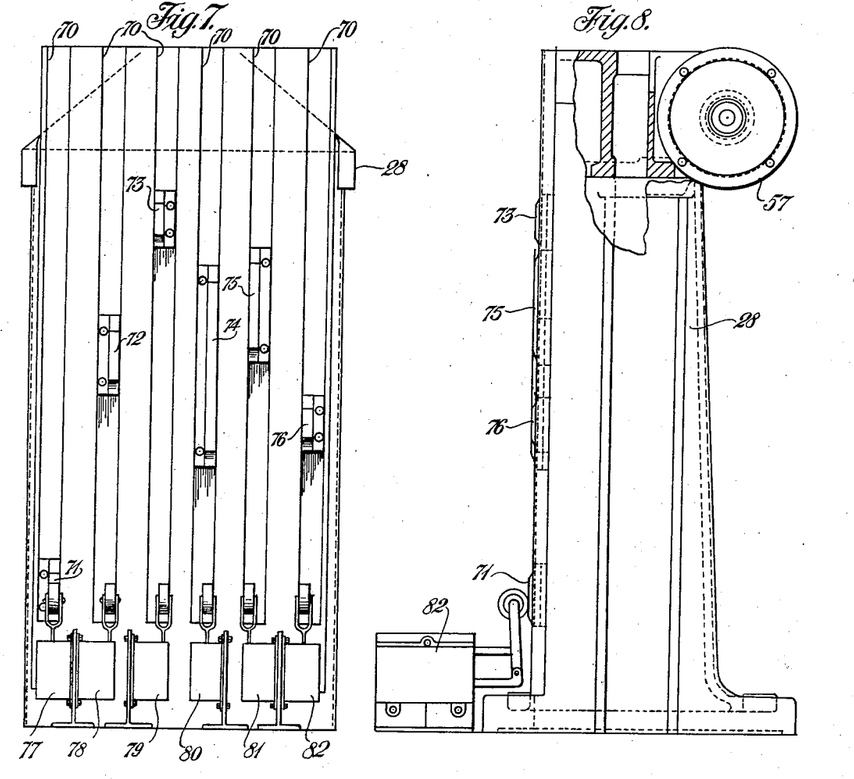
Fig. 7 is a detail front elevation of a cam panel in the apparatus, and electrical switches operated by the cams thereon.
Fig. 8 is a side elevation of the structure shown in Figure 7.

The front of the pedestal 28 is a broad planar surface or panel as is best shown in Fig. 7, and formed in said surface are a plurality of parallel vertical grooves 70, 70, herein shown as six in number. Said grooves extend from the top of the pedestal substantially to the bottom thereof, and in each groove is mounted a cam, the latter, reading from left to right of Fig. 7, being designated 71, 72, 73, 74, 75 and 76 respectively. Said cams may be adjusted lengthwise of the grooves 70 so as to be disposed in proper position with relation to each other, and also they may be of different length as shown. Mounted upon the top of the housing 17 are six electrical switches designated 77, 78, 79, 80, 81 and 82 respectively, the operating levers of said switches extending into the paths of the cams 71 to 76 respectively. The arrangement is such that the cams operate said switches in the sequence desired as the cylinder 24 and pedestal 28 are moved down and up by the reversible motor 38.

Of the six switches mentioned, switch 77 is a limit switch in the control circuit of motor 38, operation of the switch effecting the stopping of the drive of the said motor at the upper limit of movement of the cylinder 24. Switch 78 is in the control circuit of motor 38 and serves to stop the latter during the descent of the cylinder 24 shortly after the cylinder engages the tire band to be shaped. Switch 79 also is in the control circuit of motor 38 and serves to stop the latter as the cylinder 24 reaches the lower limit of its operative movement. Switch 80 controls the operation of a solenoid valve (not shown) in the supply pipe 21 that conducts air under pressure to the interior of a tire band being shaped so as to distend said band, the arrangement being such that when cam 74 is engaged with switch 80 the air is entering the tire and when the cam is disengaged from the switch the air is vented from the tire. Switch 81 is in the control circuit of the solenoid valve (not shown) which controls the flow of fluid to the expansible core that is inserted in the tire, said switch effecting operation of the solenoid to shut off the supply of air to the core. Switch 82 is in the control circuit of the motor 55 and, when operated by the cam 76, serves to start the drive of said motor in the direction that lowers the hook 45.

Figure 13:
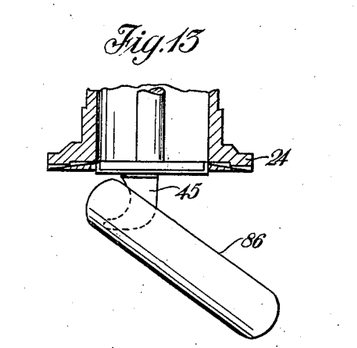
Figs. 13 to 17 inclusive are somewhat diagrammatic views of the work and the work-engaging elements of the apparatus showing the successive steps in a cycle of operation of the apparatus.
Figure 14:
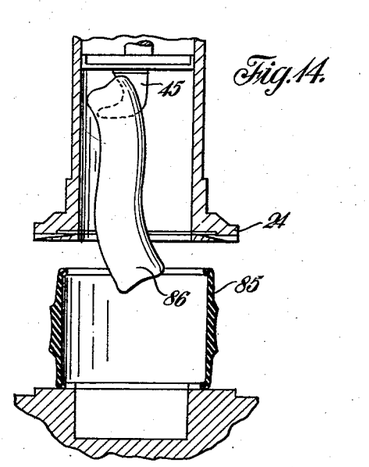
Figure 15:
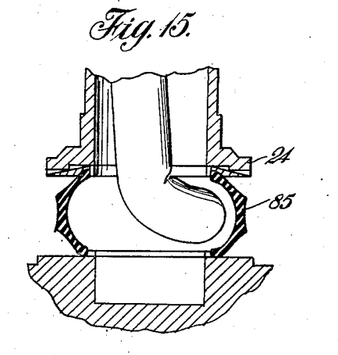
Figure 16:
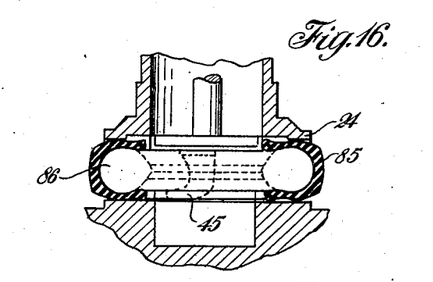
Figure 17:
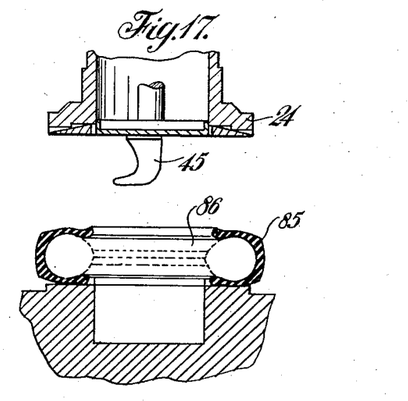

The various operations required for shaping a tire band and mounting an expansible core therein are illustrated somewhat diagrammatically in Figs. 13 to 17 inclusive wherein 85 designates the tire band and 86 designates the expansible core. At the beginning of operation the cylinder 24 is in elevated position, but the hook 45 is in lowered position relatively of the cylinder and projects from the bottom thereof. An operator hangs the core 86 from the hook 45 and holds the core at an angle, as shown in Fig. 13, while the hook is caused to rise and draw the core up into cylinder 24, as shown in Fig. 14. With the core thus raised, a tire band 85 is mounted upon the stationary lower plate 19. Next, the cylinder 24 is caused to descend, and in so doing engages with the upper margin of the tire band 85. The descent of the cylinder is stopped briefly (about 4 seconds) and during this interval air admitted to the tire band partly distends the latter, the hook 45 begins to move downwardly to fed the core 86 into the tire, and fluid pressure is admitted to the core so that it will assume circular form as it enters the tire band. The relative positions of the various elements during the said dwell of the cylinder is shown in Fig. 15. Thereafter the cylinder resumes its descent and continues until the lower limit of its movement is reached, as shown in Fig. 16, at which time the inflated core 86 has disengaged itself from the hook 45 and seated itself within the distended tire. As soon as the cylinder reaches its lower limit of movement, the air within the tire and the core is exhausted therefrom, and cylinder 24 rises and carries with it the hook 45, the latter, however, remaining at the lower end of said cylinder. The cylinder continues to rise until it reaches the upper limit of its travel and then stops, the hook 45 remaining in lowered position relatively of the cylinder and projecting below the latter as shown in Fig. 17. This completes a cycle of operation of the apparatus as it applies to most tires, such as are provided with single bead cores. In the larger size tires, such as are provided with double bead cores, the procedure is slightly different. In the latter case the expansible core is evacuated of air before it is drawn up into the cylinder 24, to facilitate the collapse of the core, and the cylinder is lowered to its extreme lowermost position and then elevated to its intermediate position before the collapsed core is ejected from the cylinder and fed into the tire, the cylinder again descending during the core ejecting operation.

Figure 18:
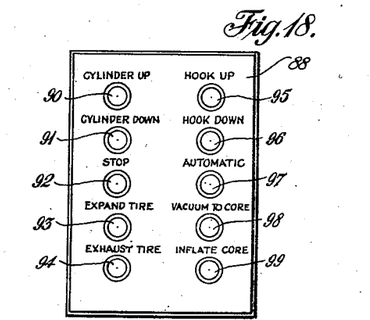
Fig. 18 is a front elevation, on a larger scale, of a switch box mounted upon the front of the apparatus.

Various movements of the elements of the apparatus are effected by the electrical power members described, and said movements may be effected automatically in proper sequence, or they may be manually controlled. To this end a switch box 88 is mounted upon the base structure 15 of the apparatus, and a plurality of manually operable push button switches are mounted in said box. The arrangement of switches in the switch box 88 is best shown in Fig. 18. As shown in said figure, switch 90 is in the control circuit of cylinder motor 38 and is used for effecting the elevation of cylinder 24 during manual operation of the apparatus. Switch 91 controls the manual lowering of cylinder 24. Switch 92 is a stop switch that stops the operation of the apparatus both in automatic and in manual operation. Switch 93 is in the circuit of the solenoid (not shown) that controls the valve in pipe 21, to open said valve and admit air under pressure to the interior of the tire band 85 to expand the same. Switch 94 is in the same circuit as switch 93 and operates the solenoid to reverse the valve in pipe 21 to evacuate the air from the tire band 85, after the same has been distended. Switch 95 is in the hook-control circuit and serves to effect the driving of motor 55 to elevate the hook 45. Switch 96 also is in the hook-control circuit and serves to effect the driving of motor 55 to lower the hook 45. Switch 97 controls a series of contacts in the hook-control circuit and cylinder-control circuit that adapts said circuits for automatic operation. Swith 98 controls the operation of a solenoid valve that controls the application of suction to the expansible core 86, to evacuate the same and thereby to facilitate collapse thereof as the core is drawn upwardly into cylinder 24. This operation is used only in the shaping of the larger size tire bands by the modified procedure hereinbefore mentioned but not illustrated. Switch 99 controls the operation of a solenoid valve (not shown) that controls the admission of fluid pressure to the expansible core 86 to cause the latter to fill out and assume its normal circular form as it is fed into the expanded tire 85, as shown in Fig. 16.

Figure 12:
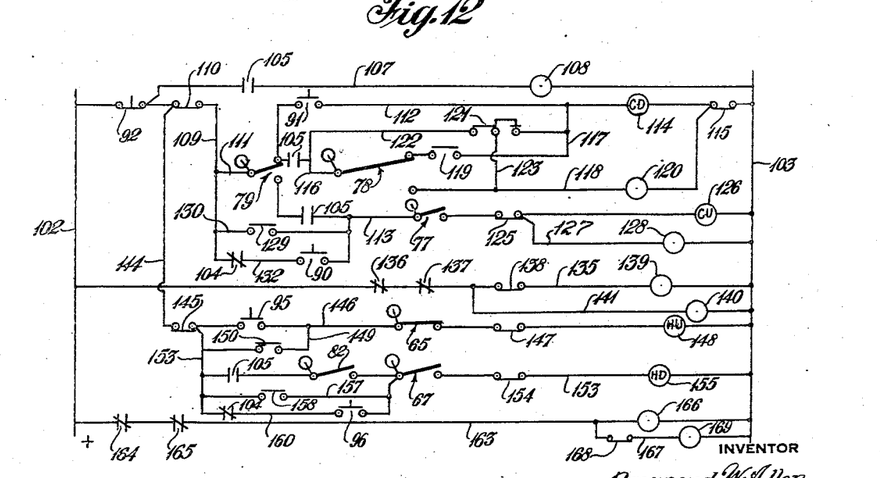
Fig. 12 is a wiring diagram of the electrical apparatus that controls the vertically reciprocable cylinder and the vertically reciprocable core-engaging hook of the apparatus.

Of the electrical control of the apparatus, only the wiring diagram of the hook control and cylinder control need be shown herein, reference being directed to Fig. 12 of the drawings wherein 102, 103 are the respective conductor wires of a 115 volt D. C. power line. The circuit includes a plurality of switches that control various functions of the circuit alternatively as the circuit is employed for manual or for automatic operation, the switches 104 being normally closed during manual operation and open during automatic operation, and the switches 105 being open during manual operation and closed during automatic operation. The switches revert to the position of normal manual operation at the conclusion of an operative cycle, and are changed to position of automatic operation by the actuation of switch 97. Extending from conductors 102 to 103 is a conductor 107 in which is the stop switch 92, a switch 105 that is closed during automatic operation, and a control relay 108 that controls the automatic operation of the solenoids that effect the inflation and exhaustion of the tire band 85 through the agency of the valve in pipe 21. Extending from the switch 92 and controlled thereby is conductor 109 in which is a normally closed switch 110 that is controlled by a dynamic brake relay presently to be described, the function of switch 110 being to open the cylinder control circuit when dynamic braking is applied to motor 38. Connected with conductor 109, by conductor 111, is switch 79 which is a make and break switch that alternatively connects conductor 109 with conductor 112 or 113, said switch normally being in the position shown in Figs. 9 and 12 in which position it closes the circuit through line 112. The latter connects switch 79 with power line 103, and includes therein the manually operated switch 91, a "cylinder down" relay 114, which when actuated, closes the power circuit through motor 38 to drive the same in the direction to lower cylinder 24, and a normally closed switch 115 that is opened, upon occasion, by a "cylinder up" relay presently to be described. Connected to the same contact of switch 79 as conductor 112 is a conductor 116 that connects with the switch 78, which is a make and break switch that alternatively connects with a conductor 117 that has connection with conductor 112 between switch 91 and relay 114, and conductor 118 that connects with conductor 112 between relay 114 and switch 115. Conductor 116 includes a switch 105 that is closed during automatic operation. Switch 78 normally closes the circuit between conductors 116 and 117, and the latter includes a switch 119 that is closed whenever relay 114 is energized. Thus the conductors 116, 117 constitute a holding circuit for the said relay to maintain it in energized condition after the manually operated switch 91 is released. The holding circuit is broken when cam 72 operates switch 78 to move it out of contact with conductor 117 and into contact with conductor 118, thus de-energizing relay 114 and activating a time relay 120 that is in the line 118. Said time relay controls a pair of normally open switch contacts 121 in a shunt circuit 122 connecting conductors 116 and 117. The arrangement is such that when motor 38 is stopped by the engagement of cam 72 with switch 78, time limit relay 120 is set into operation and after a determinate time interval closes contacts 121 of shunt circuit 122 again to operate relay 114 and thus start motor 38. The latter moves cam 72 out of operative engagement with switch 78 and the latter reverses itself to again restore connection between conductors 116 and 117. During the interval that the switch 78 is reversing itself the relay 120 is energized by means of a conductor 123 connecting conductor 118 to a contact of switch 121, which contact is broken as soon as the switch 78 is fully reversed.

Figure 9:
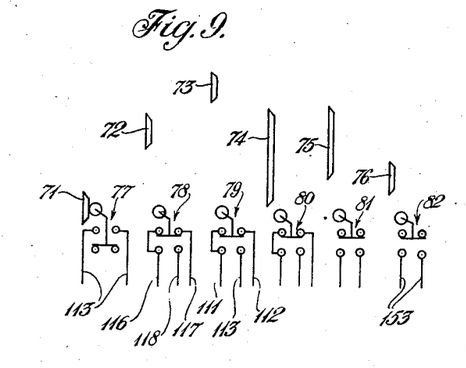
Fig. 9 is a diagrammatic view of the cams and switches shown in Figs. 7 and 8, and the electrical connections to said switches.
Figure 10:
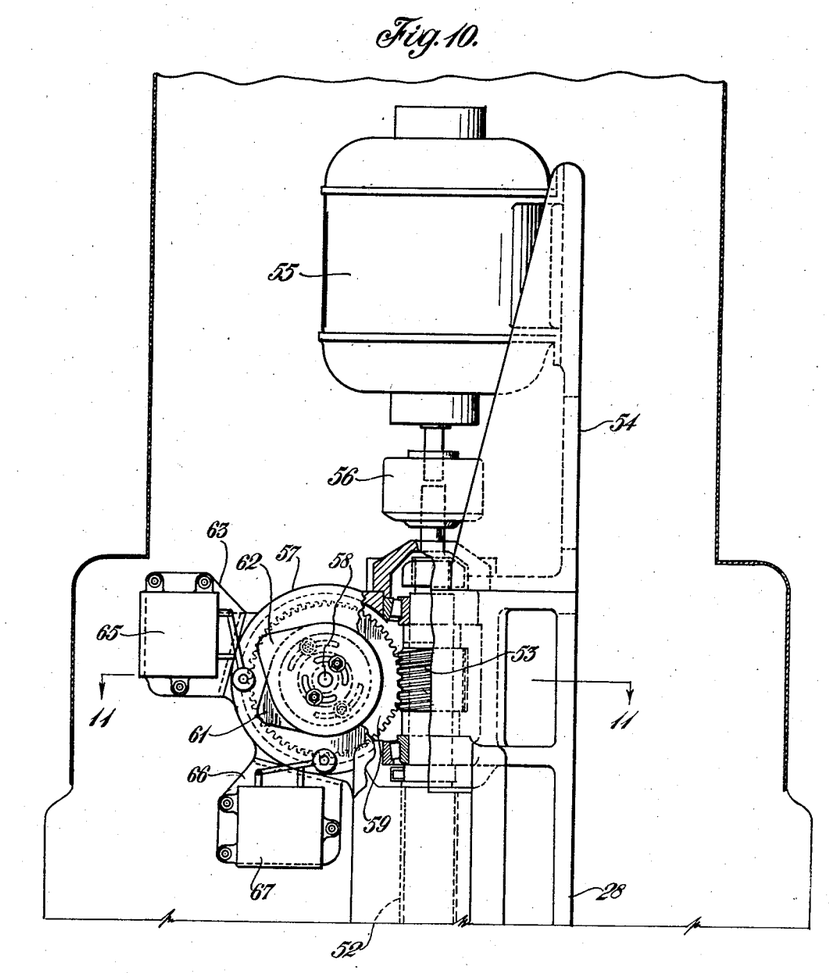
Fig. 10 is a detail side elevation, on a larger scale, of the mechanism at the top of the apparatus, a part thereof being broken away to reveal underlying structure.

In conductor 113 aforementioned is a switch 105 that is closed during automatic operation of the apparatus, the limit switch 77, a switch 125 that is operatively associated with relay 114 and is closed when the latter is energized and motor 38 is running, and a "cylinder up" relay 126 that controls the drive of motor 38 in the direction that elevates the cylinder 24. Limit switch 77 is open, as shown in Figs. 9 and 12, only when the cylinder is in its uppermost position. Thus "cylinder up" relay 126 will be energized by the switch 79 which will move into contact with circuit 113 when engaged by cam 73. This occurs when the cylinder 24 reaches its lowermost position of operation, and results in the automatic reversing of the drive of motor 38 so as to elevate the cylinder. Connecting conductor 113 to power conductor 103, is a conductor 127 in which is a control relay 128 that operates a normally open switch 129 in a holding circuit 130 for circuit 113, said holding circuit being connected to conductor 109, and to conductor 113 between switches 105 and 77. The arrangement is such that relay 128 is energized concurrently with relay 126, and holding circuit 130 maintains the power connection to relay 126 after switch 79 reverses with the rise of cam 73, relay 126 thus remaining energized until limit switch 77 is opened by cam 71 at the upper limit of movement of cylinder 24. Relay 126 controls switch 115 aforementioned and holds the latter open when relay 126 is energized. Also connecting conductors 109 and 113, between switches 105, 77 of the latter, is a circuit 132 in which is a switch 104 that is closed during manual operation, and the manually operable switch 90. The latter is used to effect the raising of the cylinder 24 during manual operation of the apparatus.

The motor 38 is equipped for dynamic braking which is effected by putting 115 v. direct current across the rotor of the motor. For operating the dynamic braking the cylinder control circuit is provided with a dynamic braking circuit comprising conductor 135 connecting power conductors 102, 103. In conductor 135 are switches 136, 137 arranged in series and controlled by the "cylinder up" relay 126 and "cylinder down" relay 114 respectively, said switches being open when said relays are energized and closed when the relays are de-energized. Also in circuit 135 is a normally closed switch 138 and the coil or relay 139 of the dynamic brake of motor 38. The switch 138 is operated by a time relay 140 that is connected by conductor 141 to conductor 135 between switches 137, 138, and to power conductor 103. The time relay 140 is energized by the relays 114, 126 whenever the latter are de-energized to close the switches 136, 137. The first result of the operation of time relay 140 is to open switch 110 and thus cut off electrical energy to the cylinder control circuits. After a brief determinate time interval the time relay opens switch 138, thereby de-energizing dynamic brake coil 139 and removing the dynamic braking current form the motor 38. This completes the description of the control of cylinder 24.

For controlling the movement of the hook 45, a conductor 144 is connected to conductor 109 between switches 92 and 110 and extends to a normally closed switch 145 that is controlled by a dynamic brake relay presently to be described. Extending from switch 145 to the power conductor 103 is a conductor or circuit 146 that includes the manually operated, normally open switch 95, the normally closed upper limit switch 65, a normally closed switch 147 that is operatively associated with a relay presently to be described, and a "hook up" relay 148, which, when energized, closes the power circuit of motor 55 to drive the same in the direction that moves hook 45 upwardly. The arrangement is such that manual closing of switch 95 will energize relay 148 and thus start motor 55 to raise hook 45. The "hook-up" circuit includes a holding circuit comprising a conductor 149 arranged to shunt out switch 95, and including a normally open switch 150 that is controlled by relay 148 and is closed by the latter whenever said relay 148 is energized.

Connected to conductor 144, between switches 145 and 95, and to power conductor 103, is a "hook down" circuit 153 comprising a switch 105 that is closed during automatic operation and open during manual operation, the normally open switch 82, the lower limit switch 67, a normally closed switch 154 that is operatively associated with "hook up" relay 148 and is closed whenever said relay 148 is de-energized, and a "hook down" relay 155, which, when energized, closes the power circuit of motor 55 to drive the same in the direction that moves hook 45 downwardly. Relay 155 also is arranged to open switch 147 of the "hook up" circuit whenever said relay 155 is energized. The "hook down" circuit includes a holding circuit 157 that is arranged to shunt out the switches 105 and 82 therein, said holding circuit including a switch 158 that is controlled by relay 155 and is closed whenever said relay is energized. The "hook down" circuit may be operated manually and to this end a circuit 160 is provided, which circuit is arranged to shunt out switches 105 and 82, and includes a switch 104 that is closed during manual operation of the device, and also includes the manually operated switch 96.

The motor 55 is equipped with dynamic braking in the same manner as motor 38, which braking is controlled by a braking circuit comprising conductor 163 connecting power conductors 102, 103. In circuit 163 are switches 164, 165 arranged in series and controlled by the "hook up" relay 148 and "hook down" relay 155 respectively, said switches being open when said relays are energized and closed when the relays are de-energized. Also in circuit 163 is a time relay 166. A conductor 167 is connected to conductor 163 between switch 165 and relay 166, and to power line 103, there being a normally closed switch 168 and the coil or relay 169 of the dynamic brake of motor 55 in said circuit 167. The switch 168 and switch 145 are operated by the time relay 166 in the same manner and for a purpose similar to the dynamic braking of motor 38 previously described.

The operation of the apparatus with relation to the circuit shown in Fig. 12, for automatic operation, is as follows: A cycle of operation starts with the cylinder 24 in elevated position and the hook 45 in lowered position relatively thereof, as shown in Fig. 13, the electrical devices being in the condition shown in Fig. 12. The operator first hangs an expansible core 86 on hook 45, attaches an inflating hose (not shown) to the core in the usual manner, and then, while holding the core in the angular position, shown in Fig. 13, closes the "automatic" switch 97 of box 88, which results in the closing of all switches 105 and the opening of all switches 104. Next the operator presses switch button 95 to close this switch, thus energizing "hook up" coil 148 and effecting the driving of motor 55 to move hook 45 upwardly and thus to draw core 86 into cylinder 24. As the hook 45 starts upward, the cam 62 moves out of engagement with limit switch 67, thus enabling the latter to close. As the hook 45 reaches its upper limit of movement, cam 61 opens limit switch 65 and thus de-energizes relay 148 and cuts off power to the motor 55. The de-energizing of relay 148 also closes the previously open switch 164 and thus energizes dynamic brake relay 169 and time relay 166, with the result that dynamic braking is applied to motor 55 and quickly stops the same. After a brief interval time relay 166 opens switch 168 to de-energize the dynamic brake coil 169.

Next the operator places an unvulcanized tire band 85 upon the lower deflector plate 19 of the apparatus, and presses switch button 91 of the switch box 88. This energizes "cylinder down" relay 114 and starts the drive of motor 38 in the direction that lowers cylinder 24. The initial result of the downward movement of cylinder 24 is to move cam 71 away from switch 77, thus closing the latter. The next result is to move cam 74 into engagement with switch 80 to reverse the latter and thus to admit air under pressure, through supply pipe 21, to the interior of tire band 85 somewhat before the upper margin of the band is engaged and sealed by upper deflector plate 26. The descending cylinder 24 next moves cam 76 into engagement with open switch 82 to close the same with the result that "hook down" relay 155 is energized and starts the drive of motor 55 in the direction that lowers hook 45 and thereby feeds the core 86 downwardly into the tire band 85. At this time the upper deflector plate 26 has engaged the upper margin of the tire band and the latter is beginning to distend under the pressure of air admitted thereto through supply pipe 21, as shown in Fig. 15. Descent of the cylinder next brings cam 75 into engagement with switch 81 to close the same, the latter then operating a solenoid valve (not shown) that causes fluid under pressure to be admitted to expansible core 86 for the purpose of subsequently expanding the core to circular form as it is completely received within the tire. Next the descending cylinder carries cam 72 into engagement with switch 78 to reverse the same, thus opening circuit 117 and de-energizing "cylinder down" relay 114 to stop motor 38, and energizing time relay 120. During the period that the cylinder 24 is stationary, the hook 45 continues to descend to feed the core 86 into the partly shaped tire 85. After a brief time interval the time relay 120 effects the closing of switch 121, thereby re-energizing "cylinder down" relay 114 and starting the drive of motor 38 to resume the descent of cylinder 24. The tire 85 is fully distended before the cylinder 24 reaches its lowermost position, and just prior to the time the cylinder reaches its lowermost position the cam 74 passes out of engagement with switch 80 thus enabling the latter to reverse its position and cause the evacuation of the distending pressure fluid in the tire, said fluid escaping through pipe 21. At the same time cam 75 passes out of engagement with switch 81, thereby enabling the latter to open and thereby to effect the exhausting of the air in core 86.

The cylinder 24 and hook 45 reach their lowermost limits of movement at substantially the same time, the position of the elements at this time being shown in Fig. 16. As the hook 45 reaches its lowermost limit, cam 62 engages and opens limit switch 67, thus de-energizing "hook down" relay 155 and stopping the drive of motor 55. Also dynamic braking is applied to motor 55, and time relay 166 is energized, the latter subsequently releasing the dynamic braking of the said motor. As cylinder 24 reaches the lowermost limit of its movement, cam 73 engages and reverses switch 79 with the result that "cylinder down" relay 114 is deenergized and "cylinder up" relay 126 is energized. This reverses the direction of rotation of the motor 38 and the cylinder 24 begins to rise, away from the shaped tire 85, the core 86 previously having disengaged itself from the hook 45 and remaining in the tire. Rising movement of the cylinder 24, and the hook 45 carried thereby continues until cam 71 engages limit switch 77 and opens the same, thus de-energizing "cylinder up" relay 126 and stopping motor 38. Also dynamic braking relay 139 is energized to brake the motor 38 and time relay 140 is energized and subsequently opens the dynamic braking circuit. The cylinder 24, hook 45, and distended tire 85 with core 86 therein are now in the position shown in Fig. 17. The operator may now disengage the inflating hose from core 86, and remove the finished work from the apparatus. This completes a cycle of operation which may be repeated as desired.

At any time during operation the movement of the apparatus may be stopped simply by pressing the stop switch 92, which also has the effect of opening switches 105 and opening switches 104 if the said switches have been in the position for automatic operation. Thereafter any desired movements of the apparatus may be obtained simply by pressing the appropriate switch button on the switch box 88. This feature of the invention is extremely desirable since it is not unusual for something to go wrong with the work during the shaping thereof.

The apparatus is extremely flexible in that it is adjustable to meet various conditions, including the shaping of various size tire bands. Such adjustments may include the lengthening or shortening of the stroke of the cylinder 24, the lengthening or shortening of the stroke of the hook 45, and the alteration of the timing of the inflation of the tire band and the expansible core, and the evacuation thereof. For effecting such adjustments it is possible to shift the cams of the pedestal 28 longitudinally of their grooves 70, or to provide cams of greater or lesser length. Also the cams 60, 61, 62 on shaft 58 are angularly adjustable relatively of each other. With minor alteration such as the addition of switches similar to those described, the apparatus may be adapted to operate according to the modified procedure outlined for the shaping of tires with dual beads. The details of such an electrical circuit are, however, not believed necessary to the understanding of the present invention and therefore are not shown herein.

From the foregoing it will be seen that the automatic features of the apparatus are controlled by the vertical movement of the cylinder 24 and hook 45, and that no other timing devices are necessary to effect the various operations in determinate sequence and for the proper time interval. The invention conserves time and labor in the shaping of tire bands, it makes for uniformity of product, and achieves the other advantages set out in the foregoing statement of objects.

Modification may be resorted to without departing from the spirit of the invention or the scope thereof as defined by the appended claims.

What is claimed is:

1. In tire shaping apparatus of the character described, the combination of a vertically reciprocable hollow cylinder, a vertically reciprocable hook within said cylinder, a reversible motor for driving said hook, control means for said motor that is manually operable to cause the motor to raise the hook relatively of the cylinder, and means under control of the cylinder during downward movement thereof automatically operating the hook-motor control to cause descent of the hook relatively of the cylinder.

2. Tire shaping apparatus of the character described comprising a vertically reciprocable hollow cylinder, a vertically reciprocable hook within said cylinder, a reversible motor for driving said hook, which motor is carried by said cylinder, control means for said motor that is manually operable to cause the motor to raise the hook relatively of the cylinder, means under control of the cylinder during downward movement thereof automatically operating the hook control to cause descent of the hook relatively of the cylinder, and limit switches in the hook control, carried by the cylinder and operable to stop the drive of the hook motor after the latter has made a determinate number of revolutions.

3. Tire shaping apparatus of the character described comprising a vertically reciprocable hollow cylinder, a vertically reciprocable hook within said cylinder, electrically operating control means for said cylinder causing the latter automatically to execute a cycle of operation comprising downward and upward movements between determinate limits, said control means including electrical switches and a time relay for producing a motionless dwell in the operation of the cylinder at a position intermediate said limits, after manually being set in operation and electrical operating means for said hook adapted to move the some downwardly, relatively of the cylinder, in determinate time relation to the period of motionless dwell of the cylinder, said hook-operating means comprising a starting switch operated by the downward movement of the cylinder and a limit switch operated by the hook-moving means.

4. In tire shaping apparatus of the character described, the combination of a vertically reciprocable hollow cylinder, a reversible motor for reciprocating the same, manually operable switch means for energizing said motor to cause the same to move the cylinder downwardly, a switch operated automatically for stopping the motor before the cylinder has reached the limit of its downward movement, a time relay for again starting the motor to move the cylinder downwardly after a motionless dwell of determinate length, switch means operating automatically as the cylinder reaches its lowermost limit of travel to reverse the drive of the motor and thereby to move the cylinder upwardly, and switch means operating automatically to stop the drive of the motor as the cylinder rises to point of starting, said automatic switches being operated by means of the movement of said cylinder.

5. In tire shaping apparatus of the character described, the combination of a vertically reciprocable hollow cylinder, a reversible motor for driving the same, a vertically reciprocable hook within said cylinder, a reversible motor for driving said hook, respective manually operable switch means for starting the hook motor to elevate the hook relatively of the cylinder and for starting the cylinder motor to lower the cylinder, switch means operated automatically by movement of the cylinder to reverse the drive of the cylinder motor at the lower limit of movement of the cylinder, and switch means operated automatically by downward movement of the cylinder for starting the drive of the hook motor to lower the hook relatively of the cylinder.

RAYMOND W. ALLEN.